United States Patent
Ortt et al.

(10) Patent No.: US 6,781,267 B2
(45) Date of Patent: Aug. 24, 2004

(54) MOTOR FOR A POWER TOOL

(75) Inventors: Earl M. Ortt, Bel Air, MD (US); Brandon Verbrugge, Towson, MD (US); Hung T. Du, Reisterstown, MD (US); Morris R. Davies, Stewartstown, PA (US)

(73) Assignee: Black & Decker Inc., Newark, DE (US)

( * ) Notice: Subject to any disclaimer, the term of this patent is extended or adjusted under 35 U.S.C. 154(b) by 4 days.

(21) Appl. No.: 10/170,996

(22) Filed: Jun. 12, 2002

(65) Prior Publication Data

US 2002/0190583 A1 Dec. 19, 2002

Related U.S. Application Data

(60) Provisional application No. 60/298,261, filed on Jun. 14, 2001.

(51) Int. Cl.[7] .................................................. H02K 5/16
(52) U.S. Cl. ............................................. 310/90; 310/50
(58) Field of Search ............................. 310/47, 50, 90; 408/124

(56) References Cited

U.S. PATENT DOCUMENTS

| | | | | |
|---|---|---|---|---|
| 5,597,275 A | * | 1/1997 | Hogan | 408/239 R |
| 6,342,739 B1 | * | 1/2002 | Furuya et al. | 310/40 MM |
| 6,603,229 B1 | * | 8/2003 | Toye, IV | 310/90 |

* cited by examiner

*Primary Examiner*—Than Lam
*Assistant Examiner*—Judson H. Jones
(74) *Attorney, Agent, or Firm*—Harness, Dickey & Pierce, P.L.C.

(57) ABSTRACT

A power tool has a motor with end caps secured by cold forming to the motor. The end caps include bearings retained in the end cap by deformation of the end cap. The motor includes an armature shaft which is staked to retain laminates as well as a retainer on the shaft. Also, a pinion gear with a shoulder which limits movement of the shaft in the motor. A fan is on the motor armature which is secured by an adhesive which changes color during assembly. The motor also includes a demagnetization member which increases resistance to demagnetization due to elevated temperature, as well as armature reaction field.

13 Claims, 7 Drawing Sheets

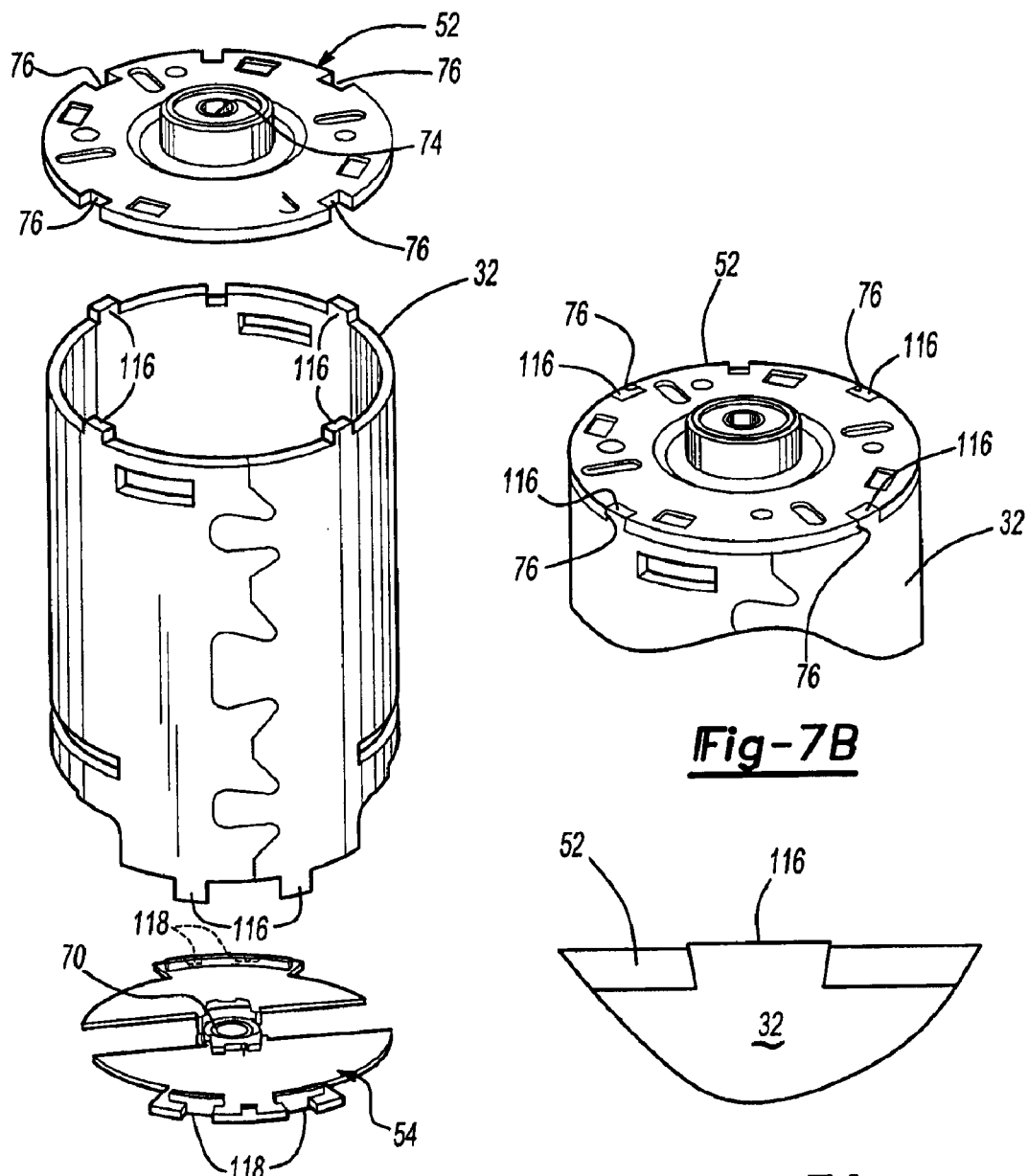

MOTOR FOR A POWER TOOL

CROSS-REFERENCE TO RELATED APPLICATION

This application claims priority to Provisional Application Serial No. 60/298,261 filed Jun. 14, 2001.

FIELD AND BACKGROUND OF THE INVENTION

The present invention relates to power tools and, more particularly, to motors for power tools.

All electric power tools, whether AC or DC powered, utilize motors to drive the outputs of the tools. Motors are a critical part of the power tool. Designers strive to improve various aspects of the motors in power tools. Specifically, designers strive to reduce motor size while increasing motor output. Designers try to reduce heat created by the motor. Designers strive to reduce the number of parts associated with the motor. Also, designers strive to reduce the possibility of demagnetization of the motor during operation. In short, motor improvement improves the overall performance of the power tool.

The present invention provides the art with an improved motor assembly. The motor includes various features which reduce the total number of parts in the motor, improve assembly, enable simpler manufacturing techniques, as well as increase the resistance of the motor to demagnetization.

SUMMARY OF THE INVENTION

In accordance with a first aspect of the invention, a power tool includes a motor comprising an end cap. The end cap has a base with a mechanism on the base to secure the base with the motor can. A recess is in the base to receive a bearing. The recess also includes an aperture to receive an armature shaft. A bearing is positioned within the recess. A portion of the base is disformed adjacent to the recess to retain the bearing in the recess. The deformation may be an annular shoulder around the entire bearing or it may be segmented with a number of segments deformed in a circular pattern around the bearing. Also, a method of retaining a bearing in the motor end cap includes positioning the bearing into the recess, deforming the motor end cap adjacent the recess, and fixing the bearing in the recess.

In accordance with a second aspect of the invention, the power tool includes a motor comprising an armature shaft assembly. The armature shaft assembly includes a shaft which includes a plurality of stakes in its outer peripheral surface. The stakes extend a desired length along the longitudinal axis of the shaft. A plurality of laminates are positioned on the shaft. The plurality of laminates have an aperture which slips onto the shaft and is then pressed on and retained by the plurality of stakes on the shaft. A retaining member which includes a bore is also slipped onto the shaft. The retainer is pressed onto the plurality of stakes to maintain position of the retainer on the shaft. The retainer is a metal part. The retainer, along with the laminates, are coated to provide additional resistance against movement with respect to the shaft.

According to a third aspect of the invention, a power tool includes a motor assembly comprising a motor can having two ends. Each end includes an end cap. An armature mechanism is rotatably positioned within the motor can. The armature mechanism includes a shaft with a portion of the shaft extending from one of the end caps to receive a pinion gear. A pinion gear is positioned on the shaft. The pinion gear includes a shoulder extending towards the end cap. The shoulder is adapted to limit movement of the armature mechanism in the motor can. The shoulder has a desired length to enable a clearance between a commutator and the other end cap in the event of movement of the armature mechanism.

According to a fourth aspect of the invention, a power tool includes a motor with a fan positioned on the armature. The armature is provided and the fan is coupled with the armature assembly. An adhesive is placed onto the fan to secure the fan to the armature assembly. The adhesive is a first color, generally bright yellow, when the adhesive is wet. The adhesive is enabled to cure to permanently fix the fan to the armature assembly. Upon curing, the adhesive changes color from a first color to a second color. Preferably, the second color is brown. This enables an assembly line worker to realize that the fan has either just been positioned onto the armature assembly, by viewing the bright yellow color, or that the fan adhesive is cured and the fan is fixed onto the armature assembly to enable further assembly of the motor.

In accordance with a fifth aspect of the invention, a power tool includes a motor which comprises an end cap secured with the motor can. The motor can includes a plurality of extending fingers. The end cap is provided with a plurality of recesses corresponding to the number of the plurality of fingers. The end cap is positioned with the motor cap such that the plurality of fingers mesh with the plurality of recesses. The extending fingers are cold worked to deform the fingers at the end cap. This deforming secures the end cap with the motor can via the plurality of deformed extending fingers. This method of attaching the end cap to the motor can also centers the end cap on the motor can.

In accordance with a sixth aspect of the invention, a power tool includes a motor which has an increased resistance to demagnetization. The motor comprises a motor can having two ends with end caps coupled with the ends of the motor can. An armature assembly is rotatably positioned within the motor can. A magnetic mechanism is positioned in the motor can. The magnetic mechanism includes a housing with at least one magnet secured to the housing. The housing includes at least one aperture with the at least one magnet including magnetic material which extends into the aperture filling the aperture with magnetic material. The increased magnetic material portion of the at least one magnet reduces the susceptibility to armature reaction demagnetization at that position. The housing may include a ring member which is positioned within the motor can. Also, when the ring member is used, the motor can may include at least one aperture aligned with the other aperture to receive additional magnetic material to increase the resistance to demagnetization. Also, the motor can itself may act as the housing and include the at least one aperture.

From the following detailed description, taken in conjunction with the drawings and subjoined claims, other objects and advantages of the present invention will become apparent to those skilled in the art.

BRIEF DESCRIPTION OF THE DRAWINGS

FIG. 4b is an assembled view of FIG. 4a.

FIG. 7a is an exploded perspective view of the motor can with end caps.

FIG. 7b is a perspective view of one of the end caps on the motor can.

FIG. 7c is an elevation view of the end cap secured to the motor can.

DETAILED DESCRIPTION OF THE PREFERRED EMBODIMENTS

Figure 1:
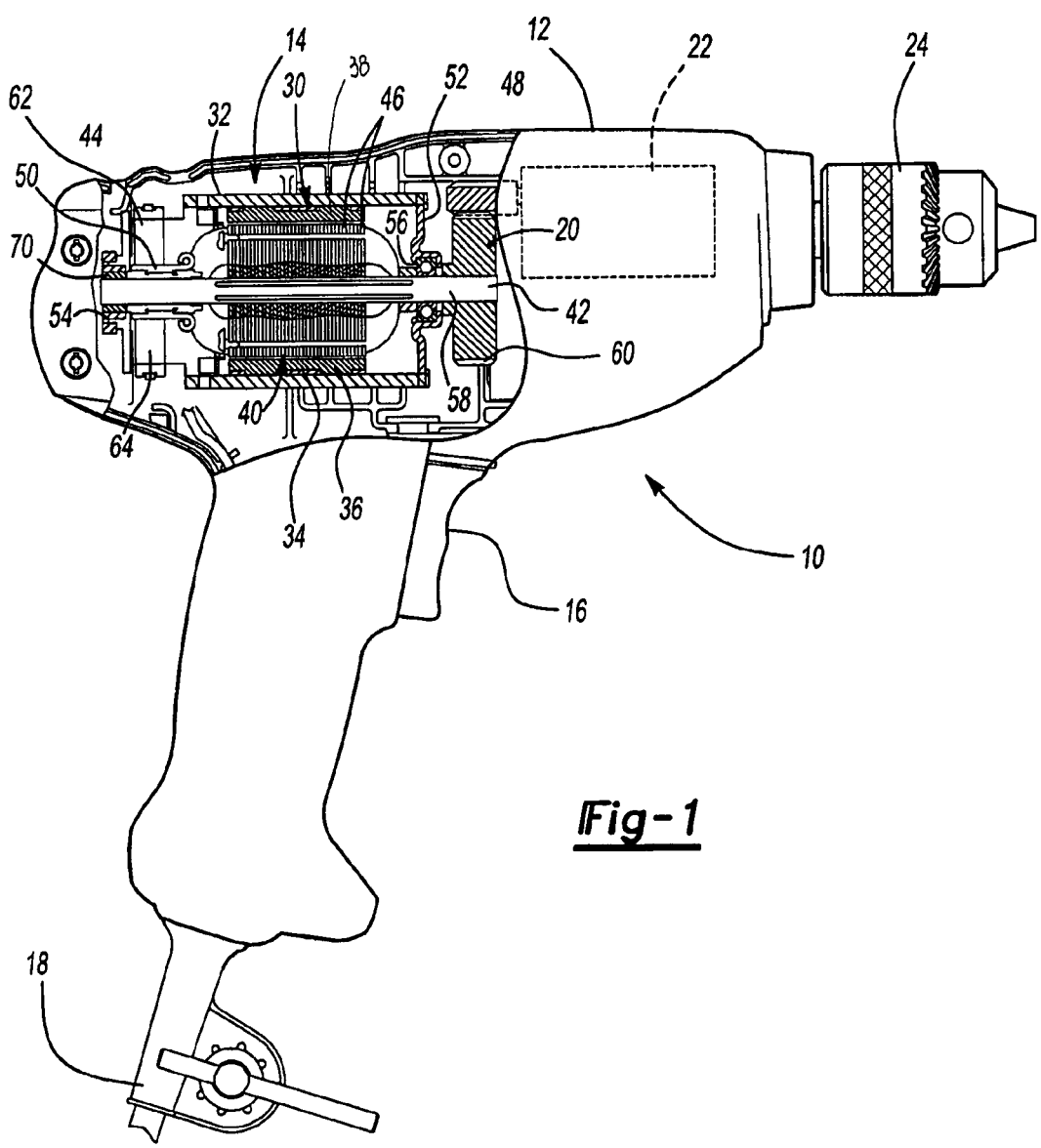
FIG. 1 is a partially in cross-section plan view of a power tool in accordance with the present invention.

Turning to FIG. 1, a power tool in accordance with the present invention is illustrated and designated with the reference numeral 10. The power tool 10 is illustrated as a drill; however, any type of power tool such as a screwdriver, sander, rotary tool, clippers, saw or the like which utilize an electric motor may be used with the motor of the present invention. The power tool 10 includes a housing 12 which surrounds a motor 14. An activation member 16 is coupled with the motor 14 as well as with a power source 18. The power source 18 may be a power cord (AC current) as shown or the power tool may have a battery (DC current). The motor 14 is coupled with an output 20 which may include a transmission 22 and a chuck 24 to retain a tool (not shown) with the drill.

The motor 14 includes a magnetic stator assembly 30 which includes a motor can 32, flux ring 34, and magnets 36 and 38. An armature 40 includes a shaft 42, a rotor 44 with laminations 46 and windings 48, as well as a commutator 50 coupled with the shaft 42. The motor also includes end caps 52 and 54. The end cap 52 includes a bearing 56 which balances one end of the shaft 58 which is coupled with a pinion 60. Brushes 62 and 64 are associated with the commutator 50. A bearing 70 is coupled with the end cap 54 to balance rotation of the shaft 42.

Figure 2:
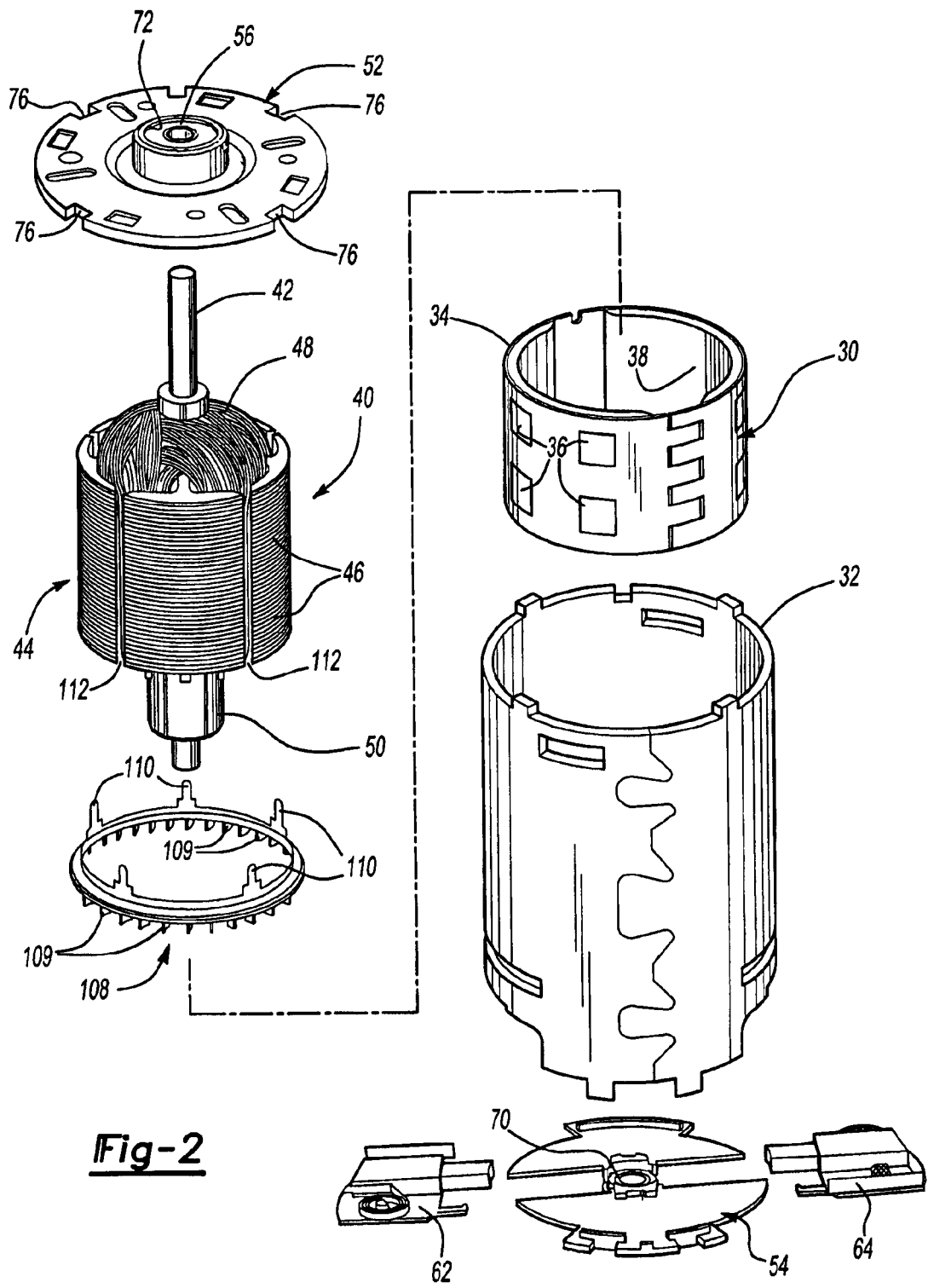
FIG. 2 is an exploded view of the motor of FIG. 1.
Figure 3A:
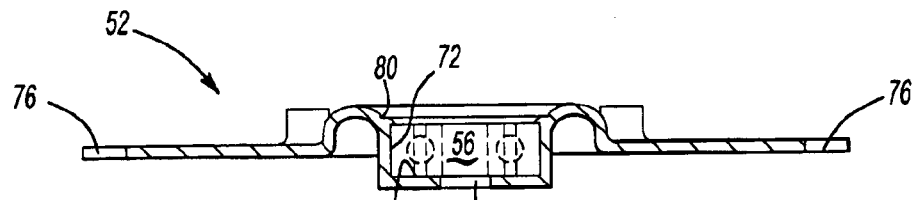
FIG. 3a is a cross-section view of the end cap of FIG. 2 along line 3—3 thereof.

Turning to FIGS. 2 and 3, the end cap 52 is illustrated. The end cap 52 has an overall circular configuration with a central recess 72 housing bearing 56. The recess 72 includes a bore 74 which enables passage of the shaft 42. The end cap 52 also includes a plurality of cut-outs or recesses 76 on the periphery of the end cap 52. A shoulder 78 is formed by a deformation of a portion of the end cap adjacent recess 72. The deformation groove 80 may be circular and surround the bearing 56. Alternatively, there may be a number of disjointed groove segments forming a circular pattern. Also, the end cap 52 is generally formed from a metallic material which may be stamped with a desired configuration as well as including the recesses and apertures.

Figure 3B:
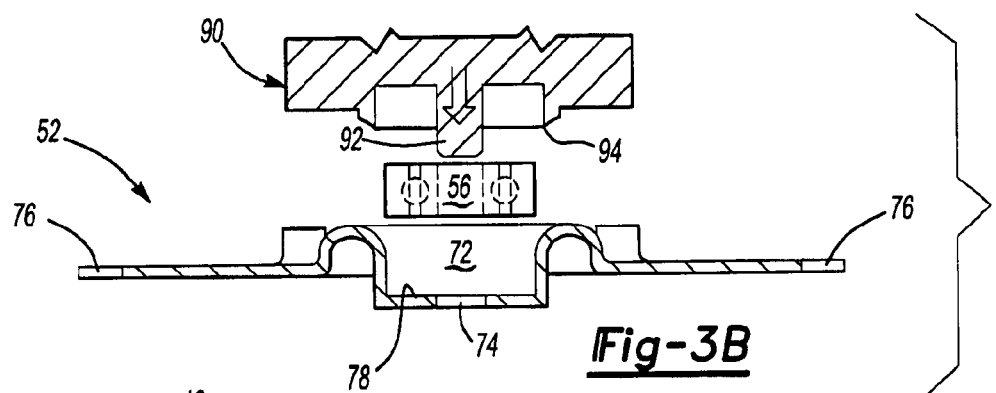
FIG. 3b is a cross-section view of the end cap of FIG. 2 prior to deforming of the end cap.

Turning to FIG. 3b, the method for forming the end cap will be better explained. FIG. 3b illustrates a cross-section of the end cap 52 prior to the bearing 56 being permanently affixed to the end cap 52. As can be seen, the recess 72 is sized to receive the bearing 56. The bearing 56 is positioned within the recess 72. A tool 90 having a centering member 92 and a deformation member 94 is positioned with respect to the end cap so that the positioning member 92 fits within the bore of the bearing 56 as well as the bore 74 of the end plate 52. As this occurs, the deformation member 94 contacts the end cap 52 forming the shoulder 78. Accordingly, the deformation member 94 may be continuous or discontinuous (as shown in phantom in FIG. 3b) to form the groove 80.

Figure 4A:
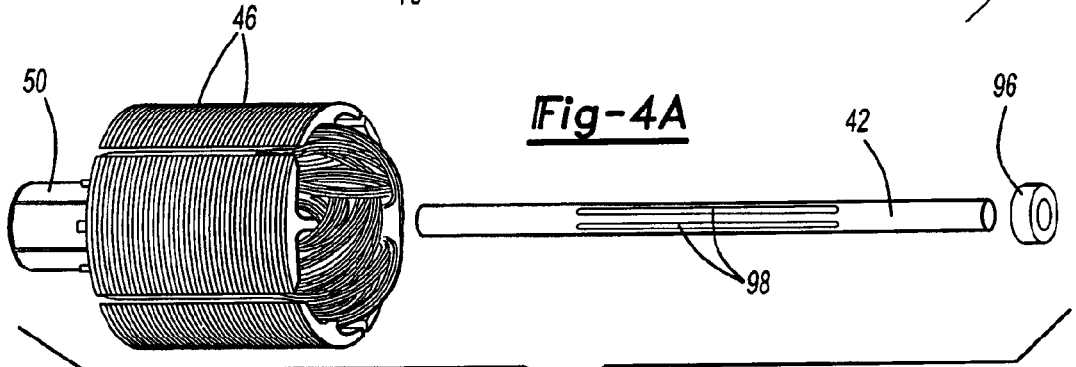
FIG. 4a is an exploded perspective view of the armature assembly of FIG. 2.
Figure 4B:
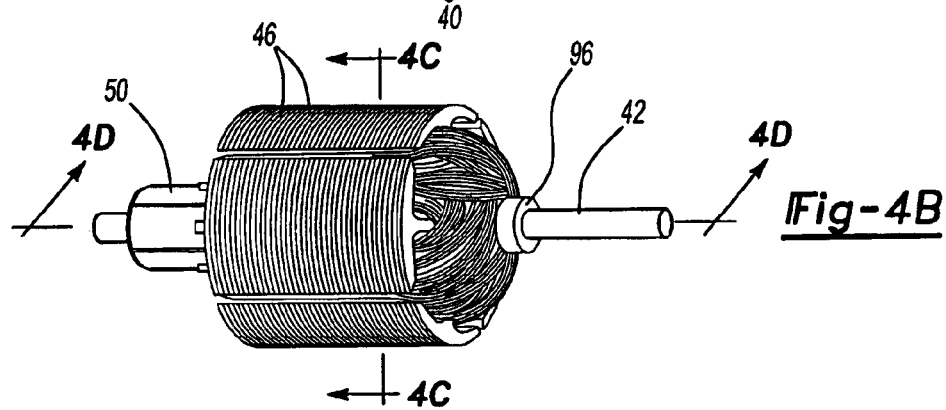
Figure 4C:
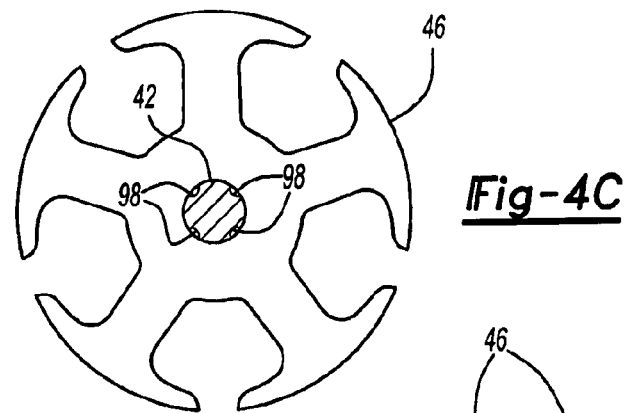
FIG. 4c is a cross-section view through lines 4c–4c of FIG. 4b.
Figure 4D:
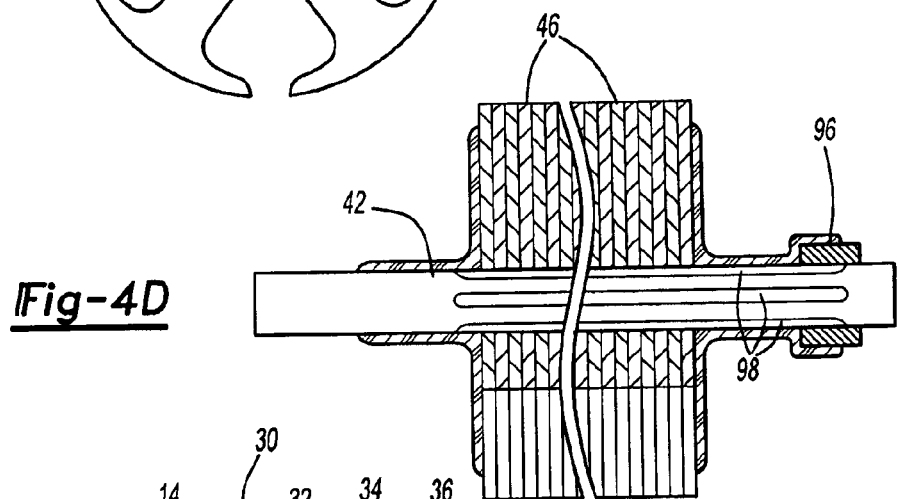
FIG. 4d is a cross-section view of FIG. 4b along line 4d–4d thereof.

Turning to FIGS. 4a–4d, parts of the armature 40 are shown. Here, the laminations 46, shaft 42 and retainer 96 are shown. The shaft 42 includes a plurality of stakes 98 which run longitudinally with respect to the axis of the shaft 42. The stakes 98, generally four in number, extend a desired distance along the shaft. However, the stakes 98 do not extend to the ends of the shaft. Thus, smooth portions are at each end of the shaft 42. The stakes do have a desired length in order to receive and retain the laminations 46 as well as the retainer 96. The laminations 46, as seen in FIG. 4c, have a desired design with a central aperture which is substantially circular. The laminations 46 are slid onto the shaft over the smooth ends until they are pressed and retained on the stakes 98. Likewise, the retainer 96 is cylindrical, having a cylindrical bore. The retainer 96 slides onto the end of the shaft until it contacts the stakes 98. At that time, the retainer 96 is pressed onto the shaft so that the stakes retain the retainer 96 onto the shaft 42. The retainer 96 is generally metallic or a powder metal part. Accordingly, the retainer 96 can ride directly against the bearing 56 provided that the thrust pressure/velocity limits of the material are not exceeded. This eliminates the need for additional washers between the retainer and sleeve bearing 56. Also, an epoxy coating is on the laminates 46 and retainer 96 to enhance retention on the shaft 42.

Figure 5:
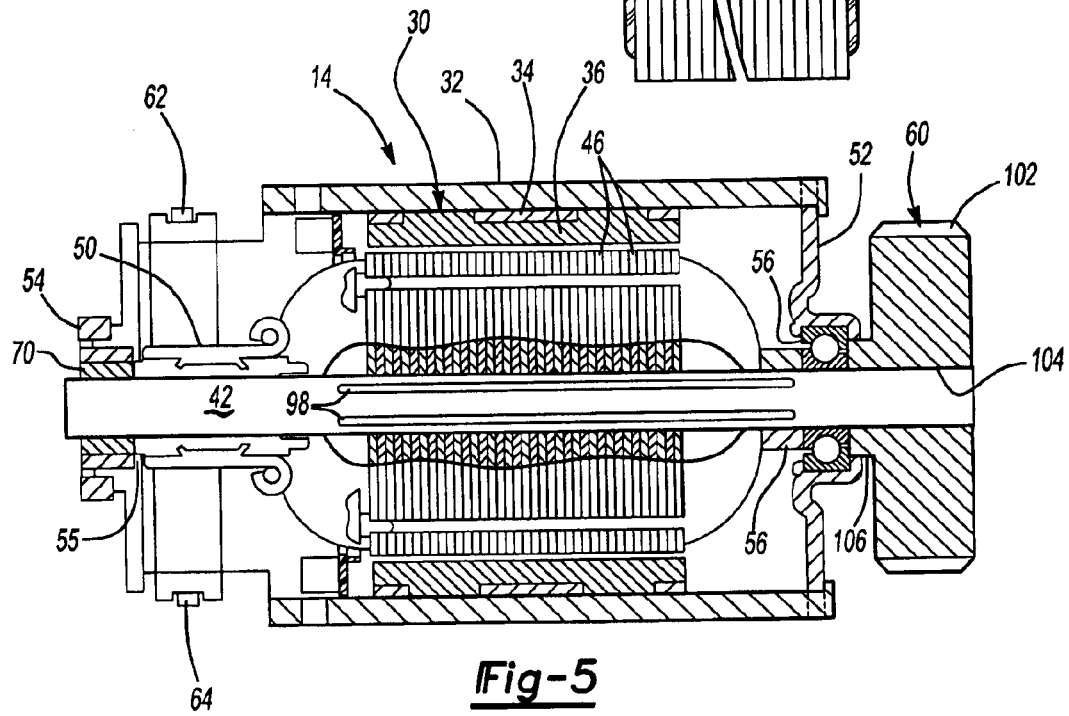
FIG. 5 is an enlarged section view of the motor of FIG. 1.

Turning to FIG. 5, the pinion gear 60 is illustrated. The pinion gear 60 includes teeth 102 as well as a central bore 104. Also, a shoulder 106 is unitarily formed with the pinion gear 60. The shoulder 106 has a desired length and extends towards the end cap 52. In the motor 14, it is critical to maintain a clearance 55 between the commutator 50 and end cap 54. If this clearance is not kept, it is possible that the motor may seize. The shoulder 106 helps to limit the movement of the armature shaft 42 and commutator 50. If the armature shaft 42 slips in the bearings 56 and 70, the pinion shoulder 106 eventually contacts the bearing 56 which is fixed to the end cap 52. Accordingly, the armature shaft 42 may only slip a desired amount so that the commutator clearance is always present to prevent seizing of the motor.

Figures 6A, 6B:
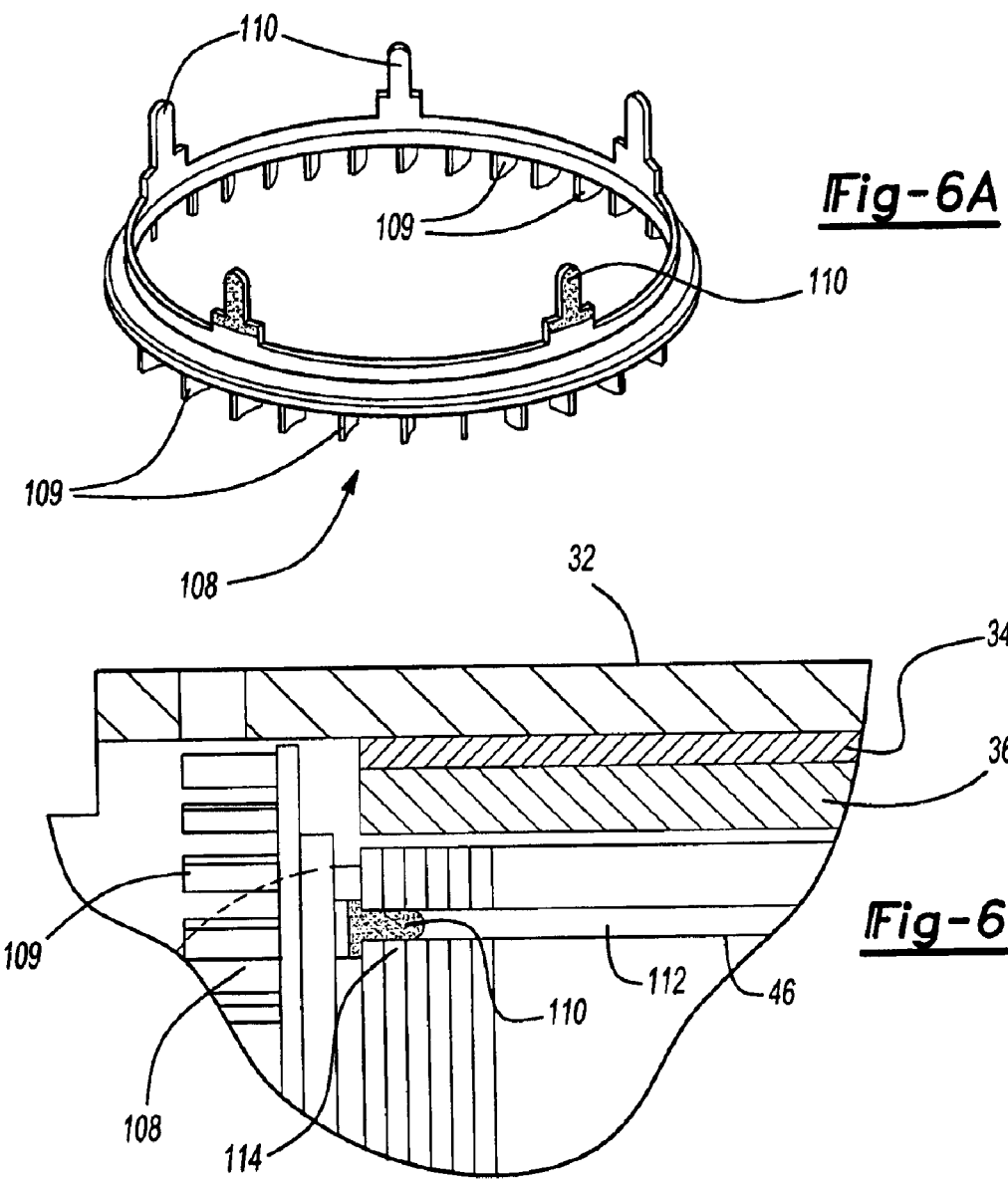
FIG. 6a is a perspective view of a fan prior to assembly with the armature assembly.
FIG. 6b is an elevation view partially in section of the armature assembly with the fan attached.

Turning to FIG. 6a, the motor fan 108 is illustrated prior to the attachment with the armature 40. As can be seen, the fan 108 has an overall disc shape with blades 109 and a plurality of extending fingers 110. The extending fingers 110 press into gaps 112 in the laminations 46. This is illustrated in FIG. 6b. Once the fingers 110 are pressed into the gaps 112, the fan 108 is coupled with the armature 40. After the coupling, an adhesive 114 is placed onto the fingers 110 and laminates 46. At the time the adhesive 114 is applied, it is wet and the adhesive is a first color, preferably a bright yellow. After the adhesive 114 cures, the fan 108 is permanently secured to the armature. After the curing of the adhesive 114, the adhesive changes color to a second color. Preferably, the cured color is brown. Thus, a person assembling the motor may visually determine whether or not the fan has been permanently secured to the laminates. The color brown indicating that the adhesive is cured and, in turn, the fan affixed to the laminates 46. Alternatively, if the fan has just been adhered to the laminates 46, the bright yellow color is present. Thus, the assembler can easily visually detect whether or not the armature, which includes the fan 108, is ready for additional assembly.

Turning to FIG. 7a, the motor can 32 is shown. The motor can 32 includes a plurality of extending fingers 116. The fingers 116 mesh with the recesses 76 in the end cap 52. Also, end cap 54 includes recesses 118 which mesh with the extending fingers 116 on the other end of the motor can 32. As seen in FIG. 7b, the end plate 52 has been coupled with the motor can 32 so that the fingers 116 and recesses 76 are in a meshing condition. After the positioning, the fingers 116 are cold worked to deform the fingers 116 so that the end caps are permanently secured to the motor can 32 as illustrated in FIG. 7c. As can be seen in FIG. 2, the fingers 116 are deformed, having a trapezoidal shape, so that the fingers secure the end cap 52 to the motor housing 32. This cold working is also utilized to retain end cap 54 to the motor can 32.

Figure 8A:
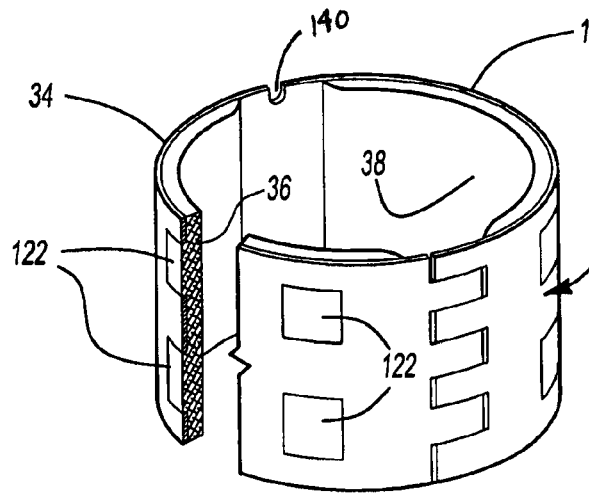
FIG. 8a is a perspective view partially in section of the magnet mechanism for providing an increase resistance to demagnetization.

Turning to FIG. 8a, the demagnetization stator member 30 is shown. The demagnetization member 30 includes a ring 120 as well as magnets 36 and 38. The ring 120 includes at least one aperture 122 strategically positioned to receive magnetic material as the magnets 36 and 38 are injection molded into the ring 120. Also, the ring includes anchors 124 like those described in pending U.S. patent application Ser. No. 09/764,004 filed Jan. 17, 2001 entitled ANCHORING SYSTEM FOR INJECTION MOLDED MAGNETS ON A FLUX RING OR MOTOR HOUSING, the specification and drawings of which are herein expressly incorporated by reference. Also, a plurality of apertures 122 may be strategically positioned around the ring 120. The magnets 36 and 38 are generally a neodymium iron boron material. This material is susceptible to demagnetization due to the amount of time the magnet spends at an elevated temperature as well as due to the armature reaction field. Thus, by adding more magnetic material, demagnetization due to the armature reaction field is reduced. Thus, the thicker the magnet is at specific locations, the better the magnet is at reducing this type of demagnetization. Also, by optimizing the location of the increased thickness magnet, which increases the magnetic strength, this reduces susceptibility to armature reaction demagnetization due to temperature. Accordingly, the thicker magnet partitions are positioned in the highest areas of demagnetization.

Figure 8B:
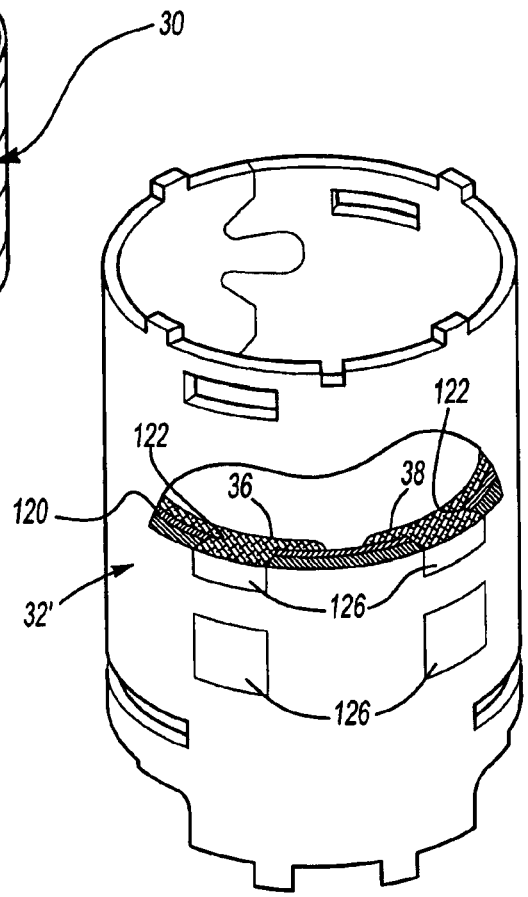
FIG. 8b is a perspective view partially in section of the magnet mechanism within the motor can.

Turning to FIG. 8b, a motor can 32' is illustrated with apertures 126. Here, the ring 120 would be secured to the motor can prior to the injection molding of the magnets 36 and 38. The apertures 122 would be aligned with apertures 126. Accordingly, when the magnetic material is injection into the ring 120, the magnet material would pass through the aperture 122 into aperture 126 of the can 32'. This, in turn, increases the thickness of the magnet at the desired position. This thickness, in turn, increases resistance to demagnetization.

Figure 8C:
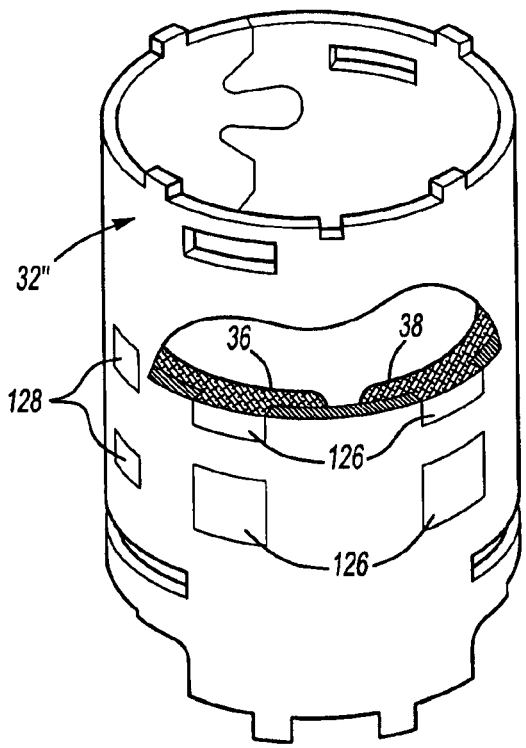
FIG. 8c is a perspective view partially in section of the motor can being a part of the magnet member.

Turning to FIG. 8c, an additional motor can 32" is shown. Here, the magnets 36 and 38 are injection molded directly onto the motor can 32". The apertures 126, as well as the anchors 124, provide their desired features as mentioned above.

The ring 120 includes an alignment notch 140. The alignment notch 140, during the injection molding of the magnets 36, 38, is placed over a pin in the mold tooling. This properly aligns the ring 120 in the tooling which, in turn, enables proper positioning of the magnets 36, 38 on the ring 120 so that the magnets are molded onto the anchors. Also, the notch 140 is used to align the flux ring 120 with respect to the motor can during assembly. Again, the notch 140 is placed over an aligning pin as the ring is positioned into the motor can.

While the above detailed description describes the preferred embodiment of the present invention, the invention is susceptible to modification, variation and alteration without deviating from the scope and fair meaning of the subjoined claims.

What is claimed is:

1. A method of retaining a bearing in a motor end cap, comprising:

producing a motor end cap including a bore extending axially in said motor end cap, said bore defined by a circumferential wall having an open end and a bottom with an aperture for receiving a shaft;

positioning a bearing into said axial bore;

deforming said wall of said circumferential wall at said opening in an axial direction; and fixing said bearing in said bore by sandwiching said bearing between said deformed axial end of said circumferential wall and said bottom.

2. The method according to claim 1, wherein said deforming step further comprising moving a portion of said motor end cap radially inward forming a shoulder for fixing said bearing in said bore.

3. The method according to claim 1, wherein said deforming radially inwardly displacing a ring of material from said motor end cap for fixing said bearing in said bore.

4. The method according to claim 1, wherein deforming radially inwardly displacing segments of said motor end cap, said segments positioned in a circle about said recess, for fixing said bearing in said bore.

5. A motor end cap, comprising:

a base;

a mechanism on said base for securing with a motor can;

a bore in said base defined by a circumferential wall and a bottom including an aperture for receiving an armature shaft;

a bearing in said bore; and a portion of said circumferential wall being axially deformed adjacent an open end of said circumferential wall sandwiching said bearing between said deformed open end of said circumferential wall and said bottom.

6. The motor end cap according to claim 5, wherein said deformed base being an annular shoulder portion.

7. The motor end cap according to claim 5, wherein said deformed base being segments positioned along a circle surrounding said bearing.

8. A motor assembly, comprising:

a motor can having two ends, an end cap at each end of said motor can, one of said end caps comprising:

a base;

a mechanism on said base for securing with a motor can;

an axially extending bore in said base, said bore defined by a circumferential wall having an open end and a bottom, said bottom including an aperture for receiving an armature shaft;

a bearing in said bore; and a portion of said circumferential wall being axially deformed adjacent said open end of said circumferential wall sandwiching said bearing between said deformed open end of said circumferential wall and said bottom;

an armature assembly in said motor can, said armature assembly including a shaft having ends received in said end caps; and a stator assembly including at least one magnet surrounding said armature assembly, said stator assembly positioned in said motor can.

9. The motor end cap according to claim 8, wherein said deformed base being an annular shoulder portion.

10. The motor end cap according to claim 8, wherein said deformed base being segments positioned along a circle surrounding said bearing.

11. A power tool, comprising:

a housing;

a motor positioned in said housing, said motor comprising:

a motor can having two ends, an end cap at each end of said motor can, one of comprising:

a base;

a mechanism on said base for securing with a motor can;

an axially extending bore in said base, said bore defined by a circumferential wall having an open end and a bottom, said bottom including an aperture for receiving an armature shaft;

a bearing in said bore; and a portion of said circumferential wall being axially deformed adjacent said open end of said circumferential wall sandwiching said bearing between said deformed open end of said circumferential wall and said bottom;

an armature assembly in said motor can, said armature assembly including a shaft having ends received in said end caps; and a stator assembly including a pair of magnets surrounding said armature assembly, said stator assembly positioned in said motor can;

an output coupled with said motor;

an activation member coupled with said motor for energizing said motor; and a power source coupled with said motor and activation member for providing power to said tool.

12. The motor end cap according to claim 11, wherein said deformed base being an annular shoulder portion.

13. The motor end cap according to claim 11, wherein said deformed base being segments positioned along a circle surrounding said bearing.

\* \* \* \* \*

UNITED STATES PATENT AND TRADEMARK OFFICE
CERTIFICATE OF CORRECTION

PATENT NO. : 6,781,267 B2
DATED : August 24, 2004
INVENTOR(S) : Earl M. Ortt et al.

It is certified that error appears in the above-identified patent and that said Letters Patent is hereby corrected as shown below:

Column 7,
Line 21, after "of" insert -- said end caps --.

Signed and Sealed this

First Day of February, 2005

JON W. DUDAS
*Director of the United States Patent and Trademark Office*